(12) United States Patent
Lee

(10) Patent No.: US 11,402,001 B2
(45) Date of Patent: Aug. 2, 2022

(54) BALL SCREW ASSEMBLY AND OPEN NUT THEREOF

(71) Applicant: Szu-Ying Lee, New Taipei (TW)

(72) Inventor: Szu-Ying Lee, New Taipei (TW)

(*) Notice: Subject to any disclaimer, the term of this patent is extended or adjusted under 35 U.S.C. 154(b) by 71 days.

(21) Appl. No.: 17/248,721

(22) Filed: Feb. 4, 2021

(65) Prior Publication Data

US 2022/0178428 A1  Jun. 9, 2022

(30) Foreign Application Priority Data

Dec. 8, 2020 (CN) .......................... 202011441288

(51) Int. Cl.
*F16H 25/22* (2006.01)

(52) U.S. Cl.
CPC ................ *F16H 25/2214* (2013.01)

(58) Field of Classification Search
CPC ... F16H 25/2214; F16H 25/22; F16H 25/2204
See application file for complete search history.

(56) References Cited

U.S. PATENT DOCUMENTS 5,012,687 A * 5/1991 Hoshide ............... B23Q 5/404
74/89.36

FOREIGN PATENT DOCUMENTS

| CN | 211449554 U | 9/2020 | |
| EP | EP-281491 A * | 9/1988 | ......... F16H 25/2214 |
| EP | 0281491 B1 | 7/1991 | |
| EP | 3828440 A1 * | 6/2021 | ......... F16H 25/2214 |
| ES | 2002953 A6 | 10/1988 | |
| JP | 2015124872 A | 7/2015 | |
| JP | 2018179077 A | 11/2018 | |
| TW | M593484 U | 4/2020 | |
| WO | 2014108792 A1 | 7/2014 | |
| WO | WO-2015084273 A1 * | 6/2015 | ......... F16H 25/2003 |

OTHER PUBLICATIONS

Extended European Search Report dated Jul. 23, 2021 from corresponding European Application No. 21161528.1.

* cited by examiner

*Primary Examiner* — Zakaria Elahmadi
(74) *Attorney, Agent, or Firm* — Innovation Capital Law Group, LLP; Vic Lin

(57) ABSTRACT

An open nut and a ball screw assembly having the open nut are provided. The ball screw assembly includes a guider, an open nut, and a ball circulating assembly. The open nut includes an axial cylinder, an open shield, and two circulators. The two circulators are respectively disposed on a first axial wall and a second axial wall of the axial cylinder with an axial opening. Each of the circulators includes an inner member and an outer member. The inner member and the outer member are assembled to each other and are respectively in communication with an inner ball race between the guider and the open nut and an outer ball race of the open nut. Therefore, the inner ball race, ball races of the two circulators, and the outer ball race form a ball circulating race, and the ball circulating assembly rolls in the ball circulating race.

16 Claims, 5 Drawing Sheets

BALL SCREW ASSEMBLY AND OPEN NUT THEREOF

CROSS-REFERENCE TO RELATED APPLICATION

This non-provisional application claims priority under 35 U.S.C. § 119(a) to Patent Application No. 202011441288.8 filed in China, P.R.C. on Dec. 8, 2020, the entire contents of which are hereby incorporated by reference.

BACKGROUND

Technical Field

The instant disclosure relates to a ball screw assembly and an open nut of the ball screw assembly, and in particular, to an open nut assembled with a two-piece circulator and a ball screw assembly using the opening nut.

Related Art

The ball screw assembly known to the inventor is provided for converting a rotation motion into a linear motion through the cooperation between the screw and the nut. By the cooperation between the ball nut provided with balls rolling in the circulating race and the screw provided with a spiral groove, the friction between the ball nut and the screw can be reduced during the operation.

Most of the ball nuts known to the inventor have complete cylinder shapes. When the length of the screw is longer and is provided with a supporting holder for preventing the screw from sagging, a resilient mechanism is provided on the supporting holder. Hence, when the ball nut rotates around the screw and passes the portion of the screw having the supporting holder, the supporting holder is temporally moved away from the screw through the resilient mechanism. Next, after the ball nut passes the portion of the screw having the supporting holder, the resilient mechanism moves the supporting holder back to the supporting position for providing a sufficient supporting force for the screw.

SUMMARY

However, when taking the aforementioned configurations, additional resilient mechanisms are configured at the supporting holders. Furthermore, when the supporting holder is at a position away from the screw, the portion of the screw corresponding to the supporting holder may sag due to its weight. As a result, when the open nut passes the portion of the screw having the supporting holder at the position away from the screw, the screw may encounter deflection, or the balls may not roll in the threaded groove properly due to the bending of the screw. Consequently, during the application of the ball guider device, the manufacturing precision becomes an issue and is to be considered.

The prior art discloses a ball nut with an opening corresponding to the supporting holder, which can smoothly pass without the resilience of the supporting holder. In addition, it has been disclosed that a circulator is disposed at the opening of the ball nut, so that the ball can circularly roll in the ball nut. However, the circulator is usually a one-piece structure integrally formed, and an additional insertion member is used for manufacturing the mold of the circulator to form a ball race, which is relatively troublesome to manufacture and also causes the development of a module more complicated.

In view of these, one embodiment of the instant disclosure provides a ball screw assembly. The ball screw assembly includes a guider, an open nut, and a ball circulating assembly. The guider has a central axis and a spiral channel, where the spiral channel is annularly disposed around an outer periphery of the guider. The open nut includes an axial cylinder, an open shield, and two circulators. The axial cylinder has an axial opening, and the axial cylinder has a first axial wall and a second axial wall respectively located at two opposite sides of the axial opening. The axial cylinder includes an inner circular wall and an outer circular wall, where the inner circular wall has an inner spiral channel, and the inner spiral channel and the spiral channel of the guider correspond to each other and form an inner ball race. The inner peripheral wall and the outer circular wall of the axial cylinder correspond to each other and form an outer ball race. The two circulators are respectively disposed on the first axial wall and the second axial wall. Each of the circulators includes an inner member and an outer member. The inner member includes a main body, a plurality of through holes, and a plurality of through slots. The through holes and the through slots are disposed in the main body, and the through holes and the through slots are disposed in a one-to-one correspondence. The through slots are provided on a long side of the main body. The outer member is assembled to the inner member correspondingly. The outer member includes a plurality of arc-shaped sliding grooves, where a first end of each of the arc-shaped sliding grooves corresponds to the corresponding through hole, and a second end at an opposite side of each of the arc-shaped sliding grooves corresponds to the corresponding through slots. The inner member and the outer member form a ball race after the inner member and the outer member are combined with each other. The ball circulating assembly includes a plurality of balls, where the inner ball race, the ball races of the two circulators, and the outer ball race form a ball circulating race, and the ball circulating assembly rolls in the ball circulating race.

In some embodiments, the through holes are a plurality of circular through holes, and the through slots are a plurality of arc-shaped through slots. The main body has a first surface and a second surface located on two opposite parallel sides of the main body, and the main body has a plurality of communication channels disposed on the second surface. The circular through holes, the communication channels, and the arc-shaped through slots are disposed in a one-to-one correspondence. The circular through holes and the arc-shaped through slots run through the first surface and the second surface, and each of the communication channels is in communication with the corresponding circular through hole and the corresponding arc-shaped through slot.

In some embodiments, a width of each of the communication channels decreases toward a middle portion of the communication channel from a connection portion between the communication channel and the circular through hole and from a connection portion between the communication channel and the arc-shaped through slot.

In some embodiments, the two circulators are respectively fixed to the axial cylinder through screwing or bolting.

In some embodiments, two positioning posts protrude from a side of the inner member away from the outer member, and the first axial wall and the second axial wall of the axial cylinder respectively have a first positioning hole. Surfaces of the open shield parallel to the first axial wall and the second axial wall respectively have a second positioning hole, and the two positioning posts of each of the inner members respectively pass through and assembled in the corresponding first positioning hole and the corresponding second positioning hole.

In some embodiments, the outer member further includes a plurality of guiding protrusions, where each of the guiding protrusions corresponds to and extends toward the second end of the corresponding arc-shaped sliding groove.

In the above embodiment, each of the guiding protrusions has an arc-shaped surface, where the arc-shaped surface corresponds to a radian of the arc-shaped sliding groove and bends toward the inner spiral channel.

In addition, an embodiment of the instant disclosure provides an open nut that may be used for the ball screw assembly. The open nut includes an axial cylinder, an open shield, and two circulators. The axial cylinder has an axial opening. The axial cylinder has a first axial wall and a second axial wall respectively located at two opposite sides of the axial opening. The axial cylinder includes an inner circular wall and an outer circular wall, where the inner circular wall has a plurality of inner spiral channels. The open shield is coaxially fitted over an outer periphery of the axial cylinder, and the open shield has an inner peripheral wall. The inner peripheral wall and the outer circular wall of the axial cylinder correspond to each other and form an outer ball race. The two circulators are respectively disposed on the first axial wall and the second axial wall. Each of the circulators includes an inner member and an outer member. The inner member includes a main body, a plurality of through holes, and a plurality of through slots. The through holes and the through slots are disposed in the main body, and the through holes and the through slots are disposed in a one-to-one correspondence. The through slots are provided on a long side of the main body. The outer member is assembled to the inner member correspondingly. The outer member includes a plurality of arc-shaped sliding grooves, a first end of each of the arc-shaped sliding grooves corresponds to the corresponding through hole, and a second end at an opposite side of each of the arc-shaped sliding grooves corresponds to the corresponding through slot. The inner member and the outer member form a ball race after the inner member and the outer member are combined with each other. One ends of the through holes of the inner member away from the outer member correspond to the outer ball race. The through slots of the inner member and the arc-shaped sliding grooves of the outer member are respectively in communication with the inner spiral channels, and one of the inner spiral channels, the ball races of the two circulators, and the outer ball race form a ball circulating race.

In some embodiments, the through holes are a plurality of circular through holes, and the through slots are a plurality of arc-shaped through slots. The main body has a first surface and a second surface located on two opposite parallel sides of the main body, and the main body has a plurality of communication channels disposed on the second surface. The circular through holes, the communication channels, and the arc-shaped through slots are disposed in a one-to-one correspondence. The circular through holes and the arc-shaped through slots run through the first surface and the second surface, and each of the communication channels is in communication with the corresponding circular through hole and the corresponding arc-shaped through slot.

In some embodiments, a width of each of the communication channels decreases toward a middle portion of the communication channel from a connection portion between the communication channel and the circular through hole and from a connection portion between the communication channel and the arc-shaped through slot.

In some embodiments, the two circulators are respectively fixed to the axial cylinder through screwing or bolting.

In some embodiments, two positioning posts protrude from a side of the inner member away from the outer member, and the first axial wall and the second axial wall of the axial cylinder respectively have a first positioning hole. Surfaces of the open shield parallel to the first axial wall and the second axial wall respectively have a second positioning hole, and the two positioning posts of each of the inner members respectively pass through and assembled in the corresponding first positioning hole and the corresponding second positioning hole.

In some embodiments, the outer member further includes a plurality of guiding protrusions, where each of the guiding protrusions corresponds to and extends toward the second end of the corresponding arc-shaped sliding groove.

In some embodiments, each of the guiding protrusions has an arc-shaped surface, where the arc-shaped surface corresponds to a radian of the arc-shaped sliding groove and bends toward the inner spiral channels.

In some embodiments, the inner member and outer member are made of different materials.

In the above embodiment, for example, the inner member may be made of a plastic material, and the outer member may be made of a metal material.

Therefore, in the ball screw assembly and the open nut according to one or some embodiments of the instant disclosure, the circulators separated into two pieces can be quickly positioned and assembled relative to each other by the correspondence of shapes of the through holes and the through slots of the inner member and shapes of the arc-shaped sliding grooves of the outer member. Moreover, a mold for manufacturing the inner member and the outer member may have a simplified structure, thus shortening manufacturing duration for the product. Moreover, materials selected for the inner member and the outer member may be changed according to the use environment, the service life, manufacturing costs, and the like. Alternatively, the inner member or the outer member may be replaced when worn out. Furthermore, by virtue of the two-piece structure, after the inner member is assembled on the axial cylinder, balls can be filled through the structures of the through hole and the through slots without using additional elements such as a baffle, thus facilitating the ball filling procedure.

Detailed features and advantages of the instant disclosure are described in detail in the following implementations, which are sufficient for any person skilled in the art to understand the technical content of the instant disclosure and implement the operations accordingly. According to the content disclosed in this specification, the scope of patent application, and the drawings, any person skilled in the art can easily understand related objectives and advantages of the instant disclosure.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
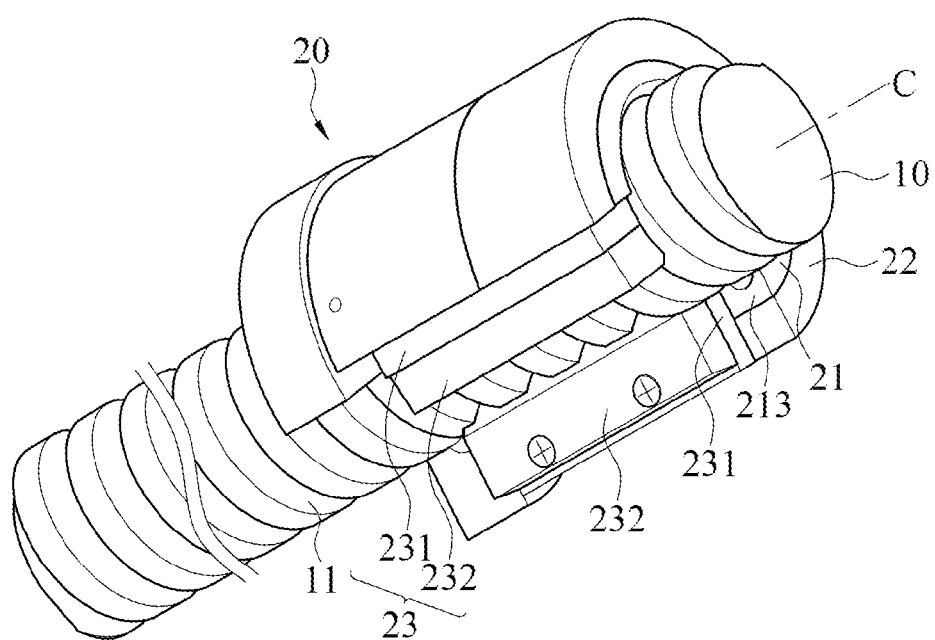
FIG. 1 illustrates a perspective view of a ball screw assembly having an open nut according to an embodiment of the instant disclosure.
Figure 2:
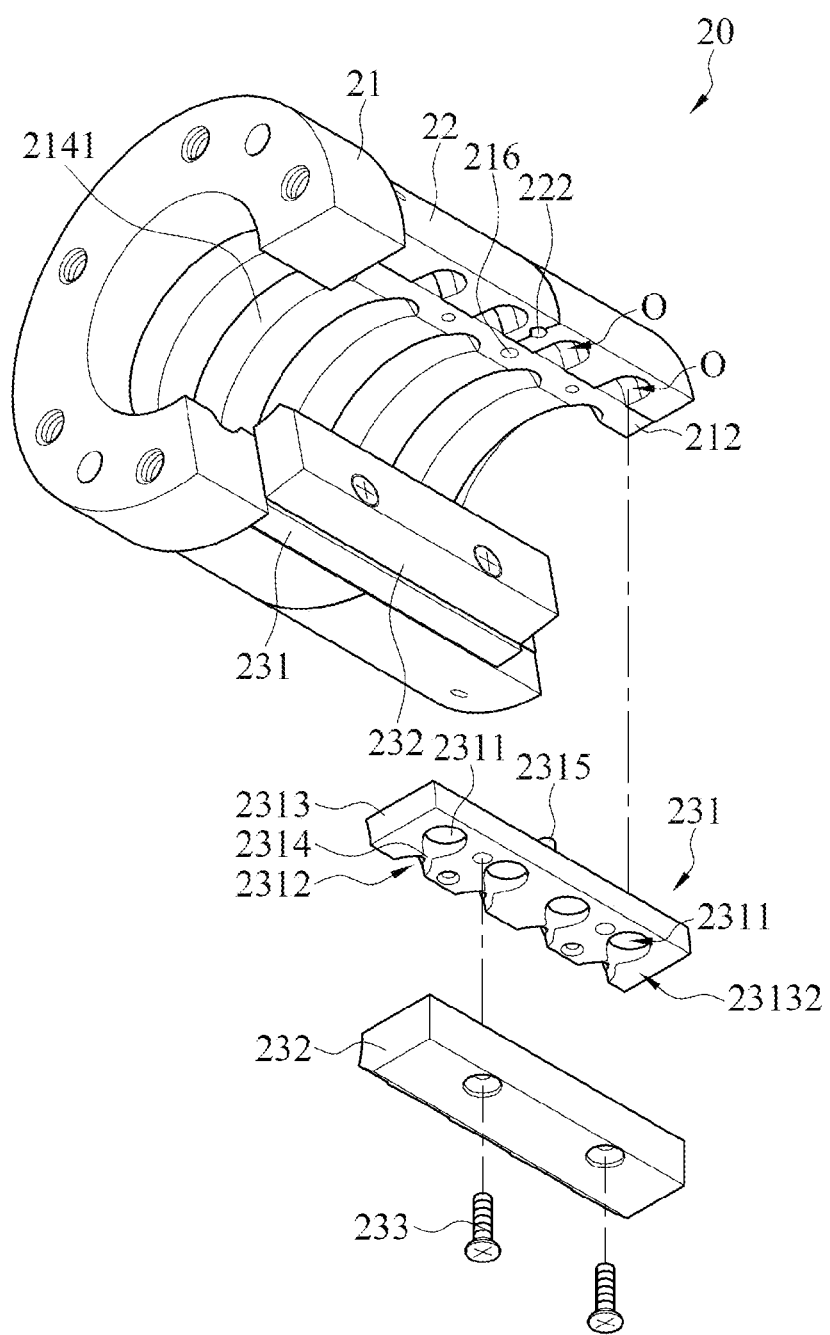
FIG. 2 illustrates a partial exploded view of an open nut according to an embodiment of the instant disclosure.
Figure 3:
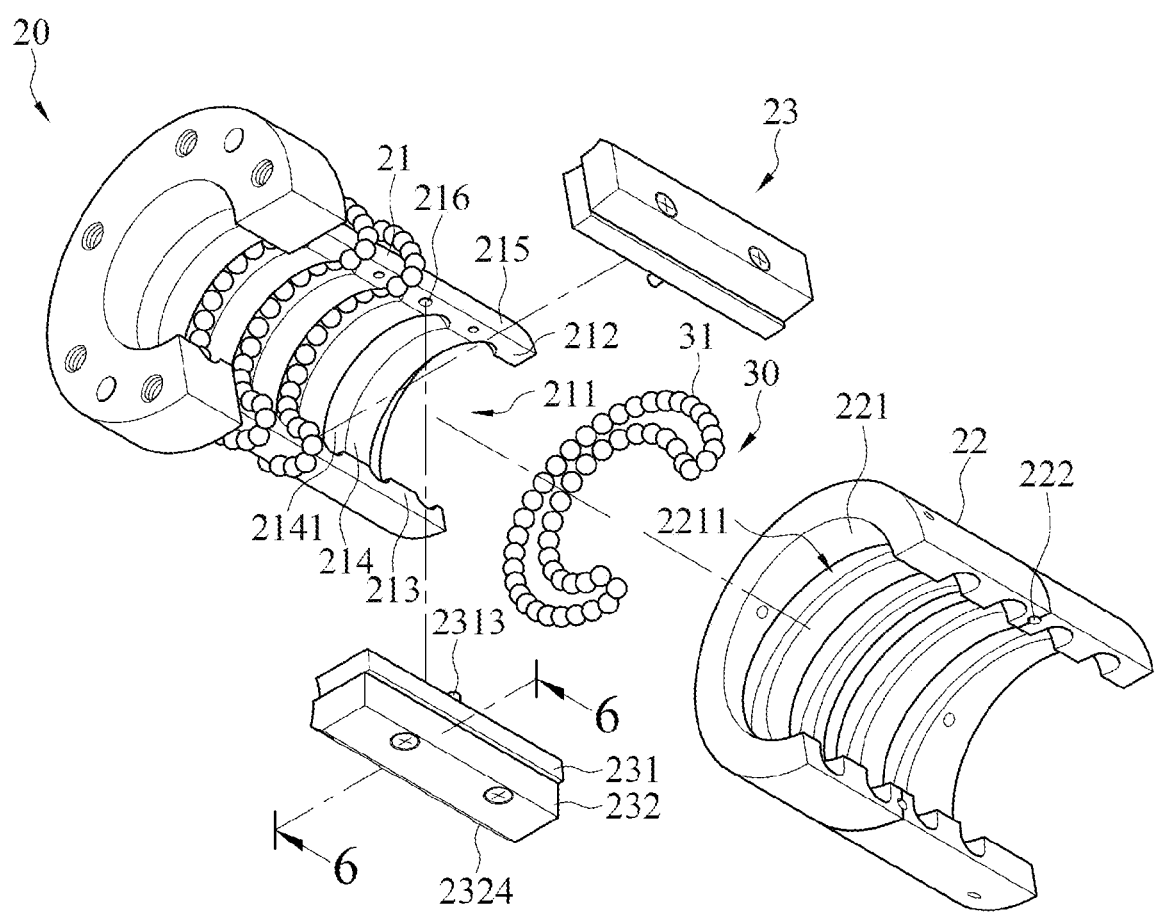
FIG. 3 illustrates an exploded view of a ball screw assembly having an open nut according to a first embodiment of the instant disclosure.
Figure 4:
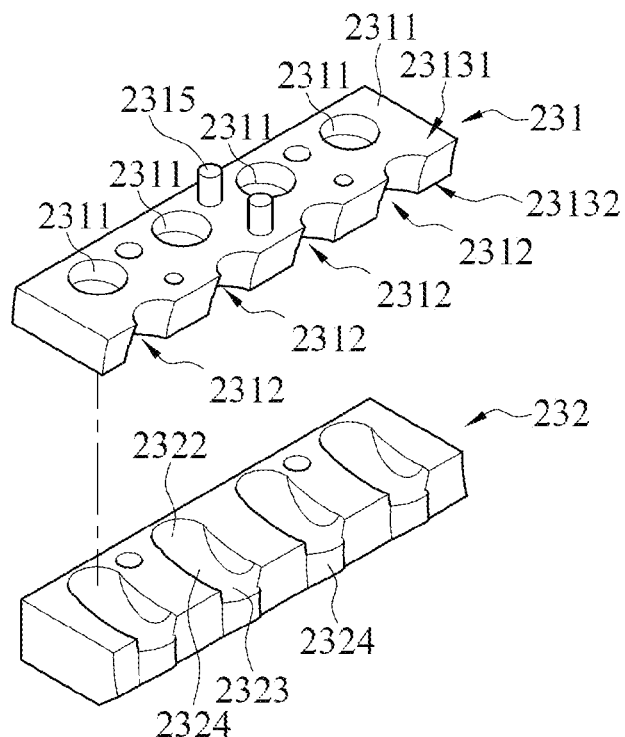
FIG. 4 illustrates an exploded view of an inner member and an outer member according to an embodiment of the instant disclosure.
Figure 5:
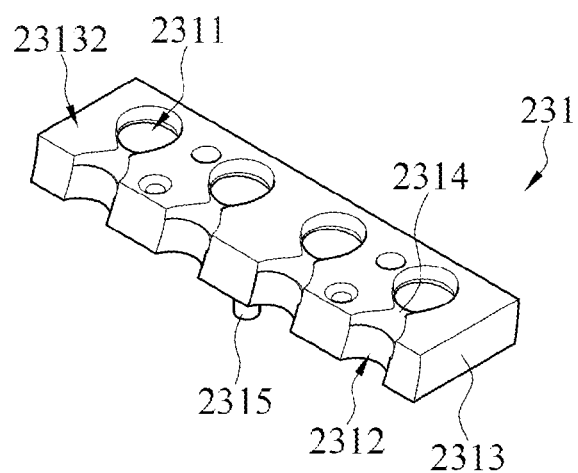
FIG. 5 illustrates a perspective view of an inner member according to an embodiment of the instant disclosure viewed from a second surface.
Figure 6:
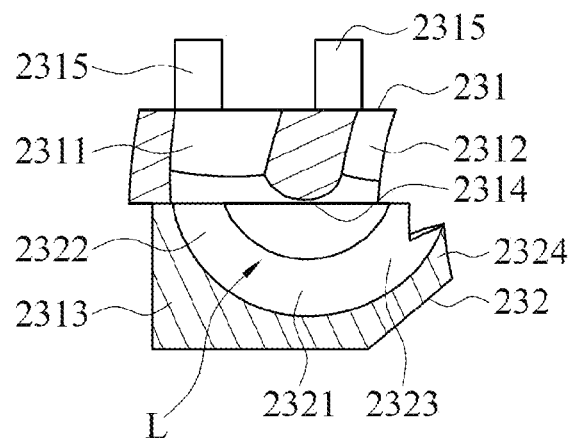
FIG. 6 illustrates a cross-sectional view taken along a section line 6-6 shown in FIG. 3 according to an embodiment of the instant disclosure.
Figure 7:
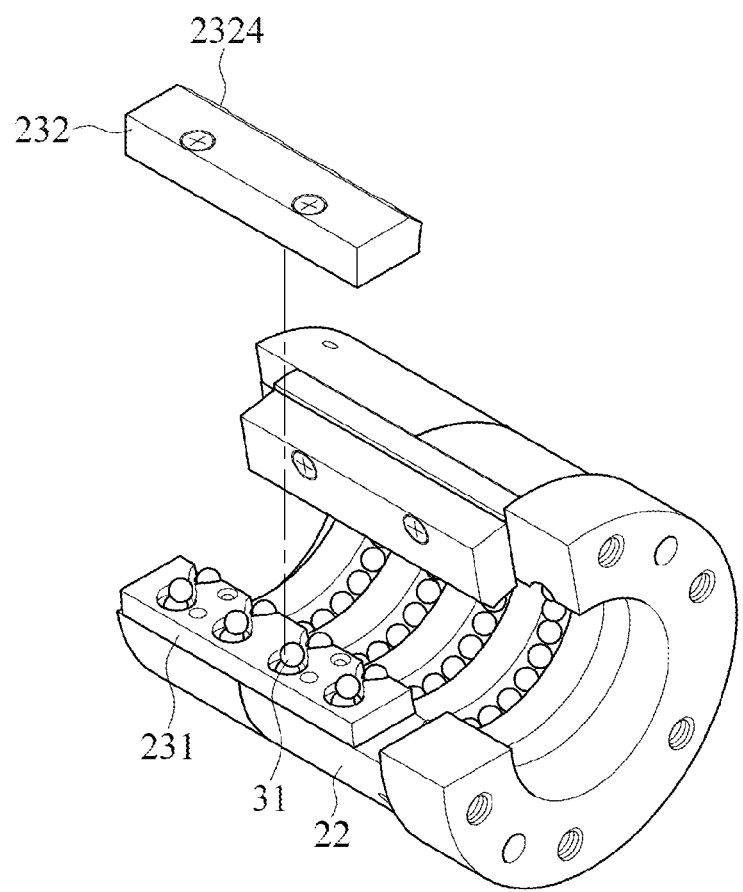
FIG. 7 illustrates a schematic view showing the ball filling procedure for the ball screw assembly according to an embodiment of the instant disclosure.

Referring to FIG. 1 to FIG. 5, FIG. 1 illustrates a perspective view of a ball screw assembly having an open nut according to an embodiment of the instant disclosure, FIG. 2 illustrates a partial exploded view of an open nut according to an embodiment of the instant disclosure, FIG. 3 illustrates an exploded view of a ball screw assembly having an open nut according to a first embodiment of the instant disclosure, FIG. 4 illustrates an exploded view of an inner member and an outer member according to an embodiment of the instant disclosure, and FIG. 5 illustrates a perspective view of an inner member according to an embodiment of the instant disclosure viewed from a second surface. FIG. 6 illustrates a cross-sectional view taken along a section line 6-6 shown in FIG. 3 according to an embodiment of the instant disclosure. FIG. 7 illustrates a schematic view showing the ball filling procedure for the ball screw assembly according to an embodiment of the instant disclosure.

It can be seen from FIG. 1 and FIG. 3 that, in this embodiment, the ball screw assembly includes a guider 10, an open nut 20, and a plurality of ball circulating assemblies 30 (the guider 10 is omitted in FIG. 3 to clearly show other structures). The guider 10 may be, for example, a screw or a conversion rod. The screw rod used as an example for description in this embodiment. It can be seen from FIG. 1 that the guider 10 has a central axis C and a spiral channel 11.

It can be seen from FIG. 1 to FIG. 3 that the open nut 20 includes an axial cylinder 21, an open shield 22, and two circulators 23. The axial cylinder 21 has an axial opening 211. The axial cylinder 21 has a first axial wall 212 and a second axial wall 213 on two opposite sides of the axial opening 211. The axial cylinder 21 includes an inner circular wall 214 and an outer circular wall 215. The inner circular wall 214 has an inner spiral channel 2141. The inner spiral channel 2141 and the spiral channel 11 of the guider 10 correspond to each other and form an inner ball race. In detail, in this embodiment, the guider 10 has a spiral channel 11 disposed around an outer periphery of the guider 10. The spiral channel 11 is disposed around the outer periphery of the guider 10 to provide a spiral angle. The open nut 20 can be slidably fitted over the guider 10, and the inner spiral channel 2141 and the spiral channel 11 the guider 10 correspond to each other and form an inner ball race.

As shown in FIG. 2 and FIG. 3, the open shield 22 is axially fitted over an outer periphery of the axial cylinder 21. The open shield 22 has an inner peripheral wall 221. The inner peripheral wall 221 and the outer circular wall 215 of the axial cylinder 21 correspond to each other and form an outer ball race. In this embodiment, in order to enable the ball circulating assembly 30 to roll in the outer ball race in a circulating manner, an inner channel 2211 is formed on the inner peripheral wall 221 of the open shield 22, and the outer circular wall 215 of the axial cylinder 21 is a plane. In this way, the inner channel 2211 and the outer circular wall 215 of the axial cylinder 21 form an outer ball race O. Therefore, the open shield 22 may be made by using a material with relatively high hardness, so that the inner channel 2211 formed on the inner peripheral wall 221 of the open shield 22 can have improved structural strength, thereby increasing the service life of the open shield 22. In addition, regarding the inner ball race formed by the inner spiral channel 2141 and the outer ball race formed by the outer channel of the axial cylinder 21, if the axial cylinder 21 and the open shield 22 are not properly positioned during cutting, the inner spiral channel 2141 may fail to be connected to the outer channel, resulting in a gap between the inner ball race, the circulator, and the outer ball race O. If the inner ball race and the outer ball race O are disposed on two different elements (for example, the axial cylinder 21 and the open shield 22 in this embodiment), the inner ball race and the outer ball race O may be aligned with each other by adjusting relative positions of the two elements, thus reducing waste of materials due to a cutting error.

Moreover, the open shield 30 not only can form the outer ball race O with the axial cylinder 21 for the ball circulating assembly 30 rolling in the outer ball race O, the open shield 22, but also provides a dustproof function.

In this embodiment, it can be seen from FIG. 2 and FIG. 3 that there are a plurality of inner spiral channels 2141, which is merely an example. According to practical requirements, the ball screw assembly may include one inner spiral channel 2141, but the ball screw assembly may include two or more inner spiral channels 2141. One inner spiral channel is exemplified in FIG. 2 and FIG. 3 for clarity and conciseness of the drawings.

Next, referring to FIG. 2 to FIG. 5 again, the two circulators 23 are respectively disposed on the first axial wall 212 and the second axial wall 213 in a symmetrical structure. Therefore, the circulator 23 assembled on the first axial wall 212 is subsequently described. It can be seen from FIG. 4 that the circulator 23 includes an inner member 231 and an outer member 232. The inner member 231 includes a main body 2313, a plurality of through holes 2311, and a plurality of through slots 2312. The through holes 2311 and the through slots 2312 are disposed at the main body 2313, and the through holes 2311 and the through slots 2312 are disposed in a one-to-one correspondence. In this embodiment, four through holes 2311 and four through slots 2312 are exemplified, and one through hole 2311 and one through slot 2312 correspond to each other and are arranged at the main body 2313 of the inner member 231 parallel to a short side of the inner member 231. In addition, the four through slots 2312 are provided on a long side of the inner member 231.

Referring to FIG. 4 and FIG. 6 together, the outer member 232 is assembled to the inner member 231 correspondingly. The outer member 232 includes a plurality of arc-shaped sliding grooves 2321. A first end 2322 of each of the arc-shaped sliding grooves 2321 corresponds to the corresponding through hole 2311, and a second end 2323 of each of the arc-shaped sliding grooves 2321 on an opposite side corresponds to the corresponding through slot 2312.

As shown in FIG. 6, after the inner member 231 and the outer member 232 are assembled to each other, a corresponding one of the through holes 2311 and a corresponding one of the arc-shaped sliding grooves 2321 form a ball race L. After the two circulators 23 are respectively assembled on the first axial wall 212 and the second axial wall 213, one end of the through hole 2311 of the inner member 231 away from the outer member 232 corresponds to the outer ball race O. The through slot 2312 of the inner member 231 and the arc-shaped sliding groove 2321 of the outer member 232 are respectively in communication with the inner spiral channel 2141 (the inner ball race). Therefore, with the structure of the inner member 231 and the outer member 232 of the circulator 23, a circular ball 31 can smoothly slide into the ball race L under the limiting of the through hole 2311, and smoothly slides into the inner ball race though the guiding of the through slot 2312, so that the ball circulating assembly 30 circularly rolls more smoothly.

The two circulators 23 may be disposed on the first axial wall 212 and the second axial wall 213 through screwing, gluing, or engaging. If the two circulators 23 are fixed on the first axial wall 212 and the second axial wall 213 through screwing like that in this embodiment, only the two circulators 23 need to be replaced instead of replacing the entire open nut 20 when the two circulators 23 are worn out after long-term use.

Further, the two circulators 23 shown in this embodiment have the same structure. Therefore, during the manufacturing process, one element can be manufactured and served as both the circulators 23 disposed on two sides. Certainly, the circulators 23 with different structures on two sides may also be applied in the ball screw assembly according to practical requirements. For example, two circulators 23 with different numbers of curves may be applied, or two circulators 23 with curves arranged differently or at different intervals may be applied.

In addition, it can be seen from FIG. 4 and FIG. 5 that, in this embodiment, the main body 2313 may further have a first surface 23131 and a second surface 23132 located on the two opposite parallel sides of the main body 2313, and the main body 2313 has a plurality of communication channels 2314 disposed on the second surface 23132. In this embodiment, the through holes 2311 are circular through holes 2311, and the through slots 2312 are arc-shaped through slots 2312. The circular through holes 2311, the communication channels 2314, and the arc-shaped through slots 2312 are disposed in a one-to-one correspondence. In other words, in this embodiment, one circular through hole 2311, one communication channel 2314, and one arc-shaped through slot 2312 correspond to each other and are equidistantly arranged at the main body 2313 of the inner member 231 along the long side of the inner member 231 parallel to the short side of the inner member 231.

It can be seen from FIG. 4 to FIG. 6 that each of the circular through holes 2311 and each of the arc-shaped through slots 2312 run through the first surface 23131 and the second surface 23132 of the main body 2313. The communication channel 2314 is in communication with the corresponding circular through hole 2311 and the corresponding arc-shaped through slot 2312. It can be seen from FIG. 5 that a width of the communication channel 2314 may decrease toward a middle portion of the communication channel 2314 from a connection portion between the communication channel 2314 and the circular through hole 2311 and from a connection portion between the communication channel 2314 and the arc-shaped through slot 2312, and the communication channel 2314 gradually protrudes toward the second surface 23132 to form a neck-like structure.

Therefore, as shown in FIG. 7, during the assembly process of the ball screw assembly, when the balls 31 are to be filled, the balls 31 may be filled after one circulator 23 is assembled on the axial cylinder 21 and the inner member 231 of the other is assembled on the first axial wall 212 or the second axial wall 213 of the axial cylinder 21. During the filling, the balls 31 may be filled into the circular through hole 2311 and the arc-shaped through slot 2313 by the structures of the circular through hole 2311, the communication channel 2314, and the arc-shaped through slot 2313. However, since the communication channel 2314 between the circular through hole 2311 and the arc-shaped through slot 2313 slightly protrudes toward the middle portion, surfaces of the communication channel 2314 on left and right sides facing the circular through hole 2311 and the arc-shaped through slot 2313 may also carry the balls 31, so that the balls 31 can fill the entire inner ball race and the entire outer ball race O. In addition, the filling of the balls 31 can be easier without using additional elements such as a baffle, which simplifies the assembly process of the ball screw assembly.

Next, it can be seen from FIG. 3 that each of the ball circulating assemblies 30 includes a plurality of balls 31. In detail, in these embodiments, the inner spiral channels 2141 (the inner ball races) aligned in order are taken as a first one channel, a second one channel, and so forth, from an end of the axial cylinder 21, and the inner channels 2211 (the outer ball races O) aligned in order are taken as a first one channel, a second one channel, and so forth, from the end of the axial cylinder 21. After the assembly of the two circulators 23 is completed, which is shown in FIG. 1, the circulator 23 disposed on the first axial wall 212 of the axial cylinder 21 correspondingly in communication with the inner ball race and the outer ball race O, and the circulator 23 disposed on the second axial wall 213 of the axial cylinder 21 also correspondingly in communication with the inner ball race and the outer ball race O. In this case, the inner ball race, the ball races L of the two circulators 23, and the outer ball race O form a ball circulating race. All of the balls 31 in each of the ball circulating assemblies 30 rolls in the ball circulating race in a circulating manner.

Through the above structure in which two circulators 23 are disposed on the axial cylinder 21, the inner spiral channel 2141 (the inner ball race) on the inner circular wall 214 of the axial cylinder 21 may be in communication with the outer ball race O through the two circulators 23. In addition, the ball circulating assembly 30 can roll more smoothly from the inner spiral channel 2141 to the outer ball race O.

The circulators 23 separated into two pieces can be quickly positioned and assembled relative to each other by the correspondence of shapes of the through holes 2311 and the through slots 2312 of the inner member 231 and shapes of the arc-shaped sliding grooves 2321 of the outer member 232. Moreover, a mold for manufacturing the inner member 231 and the outer member 232 may have a simplified structure, thus shortening manufacturing duration for the product.

Referring to FIG. 2 to FIG. 6 again, two positioning posts 2315 protrude from a side of the inner member 231 away from the outer member 232. The first axial wall 212 and the second axial wall 213 of the axial cylinder 21 respectively have a first positioning hole 216. Surfaces of the open shield 22 parallel to the first axial wall 212 and the second axial wall 213 respectively have a second positioning hole 222. The two positioning posts 2315 of each of the inner members 231 respectively pass through and assembled in the corresponding first positioning hole 216 and the corresponding second positioning hole 222.

Therefore, when the inner member 231 is to be correspondingly assembled on the first axial wall 212 or the second axial wall 213, only the two positioning posts 2315 need to respectively pass through and assembled in the corresponding first positioning hole 216 and the corresponding second positioning hole 222 for achieving the positioning. Next, after the filling of the balls 31 is completed and the outer member 232 is assembled with the inner member 231, screws 233 may be used for improving the locking, to improve efficiency of mounting and alignment.

In addition, it can be seen from FIG. 4 to FIG. 5 that the outer member 232 further includes a plurality of guiding protrusions 2324. Each of the guiding protrusions 2324 corresponds to and extends toward a second end 2323 of the corresponding arc-shaped sliding grooves 2321. Moreover, each of the guiding protrusions 2324 has an arc-shaped surface. The arc-shaped surface corresponds to a radian of the arc-shaped sliding groove 2321 and bends toward the inner spiral channel 2141 shown in FIG. 2. Therefore, the balls 31 which already passed through the arc-shaped sliding groove 2321 and are to be enter into the inner spiral channel 2141 can smoothly enter into the inner spiral channel 2141 through the guiding of the guiding protrusion 2324.

Moreover, materials selected for the inner member 231 and the outer member 232 may be changed according to the use condition, the use environment, the service life, manufacturing costs, and the like. For example, the inner member 231 and the outer member 232 are made of the same material (such as plastic, metal, or the like), or the inner member 231 and the outer member 232 are made of different materials (for example, one is made of plastic, and the other is made of metal). Therefore, the material may be selected in a more flexible manner to manufacture the element according to different situations, and the materials of the inner member 231 and the outer member 232 or worn parts may also be replaced if necessary.

In this embodiment, the inner member 231 is made of a plastic material, and the outer member 232 is made of a metal material. When made of a plastic material, the inner member 231 can be more easily manufactured with low material costs, and a weight is small. The outer member 232 made of a metal material can provide high impact resistance to increase a service life of the outer member 232. In addition, when the outer member 232 is made of a metal material with low surface friction, the balls 31 can roll smoothly in the arc-shaped sliding groove 2321.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A ball screw assembly, comprising:
   a guider having a central axis and a spiral channel, wherein the spiral channel is disposed around an outer periphery of the guider;
   an open nut comprising:
   an axial cylinder having an axial opening, wherein the axial cylinder has a first axial wall and a second axial wall on two opposite sides of the axial opening, and the axial cylinder comprises an inner circular wall and an outer circular wall, wherein the inner circular wall has an inner spiral channel, wherein the inner spiral channel and the spiral channel of the guider correspond to each other and form an inner ball race;
   an open shield coaxially fitted over an outer periphery of the axial cylinder, wherein the open shield has an inner peripheral wall, wherein the inner peripheral wall and the outer circular wall of the axial cylinder correspond to each other and form an outer ball race; and
   two circulators respectively disposed on the first axial wall and the second axial wall, wherein each of the circulators comprises:
   an inner member comprising a main body, a plurality of through holes, and a plurality of through slots, wherein the through holes and the through slots are disposed in the main body, the through holes and the through slots are disposed in a one-to-one correspondence, and the through slots are provided on a long side of the main body; and
   an outer member assembled to the inner member correspondingly, wherein the outer member comprises a plurality of arc-shaped sliding grooves, wherein a first end of each of the arc-shaped sliding grooves corresponds to the corresponding through hole, a second end at an opposite side of each of the arc-shaped sliding grooves corresponds to the corresponding through slot, and wherein the inner member and the outer member form a ball race after the inner member and the outer member are combined with each other; and
   a ball circulating assembly comprising a plurality of balls, wherein the inner ball race, the ball races of the two circulators, and the outer ball race form a ball circulating race, wherein the ball circulating assembly rolls in the ball circulating race.

2. The ball screw assembly according to claim 1, wherein the through holes are a plurality of circular through holes, the through slots are a plurality of arc-shaped through slots, and the main body has a first surface and a second surface located on two opposite parallel sides of the main body, and the main body has a plurality of communication channels disposed on the second surface, wherein the circular through holes, the communication channels, and the arc-shaped through slots are disposed in a one-to-one correspondence, the circular through holes and the arc-shaped through slots run through the first surface and the second surface, and each of the communication channels is in communication with the corresponding circular through hole and the corresponding arc-shaped through slot.

3. The ball screw assembly according to claim 2, wherein a width of each of the communication channels decreases toward a middle portion of the communication channel from a connection portion between the communication channel and the circular through hole and from a connection portion between the communication channel and the arc-shaped through slot.

4. The ball screw assembly according to claim 1, wherein the two circulators are respectively fixed to the axial cylinder through screwing or bolting.

5. The ball screw assembly according to claim 1, wherein two positioning posts protrude from a side of the inner member away from the outer member, the first axial wall and the second axial wall of the axial cylinder respectively have a first positioning hole, and surfaces of the open shield parallel to the first axial wall and the second axial wall respectively have a second positioning hole, wherein the two positioning posts of each of the inner members respectively pass through and assembled in the corresponding first positioning hole and the corresponding second positioning hole.

6. The ball screw assembly according to claim 1, wherein the outer member further comprises a plurality of guiding protrusions, wherein each of the guiding protrusions corresponds to and extends toward the second end of the corresponding arc-shaped sliding groove.

7. The ball screw assembly according to claim 6, wherein each of the guiding protrusions has an arc-shaped surface, wherein the arc-shaped surface corresponds to a radian of the arc-shaped sliding groove and bends toward the inner spiral channel.

8. An open nut, comprising:
- an axial cylinder having an axial opening, wherein the axial cylinder has a first axial wall and a second axial wall on two opposite sides of the axial opening, and the axial cylinder comprises an inner circular wall and an outer circular wall, wherein the inner circular wall has a plurality of inner spiral channels;
- an open shield coaxially fitted over an outer periphery of the axial cylinder, wherein the open shield has an inner peripheral wall, wherein the inner peripheral wall and the outer circular wall of the axial cylinder correspond to each other and form an outer ball race; and
- two circulators respectively disposed on the first axial wall and the second axial wall, wherein each of the circulators comprises:
  - an inner member comprising a main body, a plurality of through holes, and a plurality of through slots, wherein the through holes and the through slots are disposed in the main body, the through holes and the through slots are disposed in a one-to-one correspondence, and the through slots are provided on a long side of the main body; and
  - an outer member assembled to the inner member correspondingly, wherein the outer member comprises a plurality of arc-shaped sliding grooves, wherein a first end of each of the arc-shaped sliding grooves corresponds to the corresponding through hole, a second end at an opposite side of each of the arc-shaped sliding grooves corresponds to the corresponding through slot, and wherein the inner member and the outer member form a ball race after the inner member and the outer member are combined with each other;

wherein one end of each of the through holes of the inner member away from the outer member corresponds to the outer ball race, the through slots of the inner member and the arc-shaped sliding grooves of the outer member are respectively in communication with the inner spiral channels, and one of the inner spiral channels, the ball races of the two circulators, and the outer ball race form a ball circulating race.

9. The open nut according to claim 8, wherein the through holes are a plurality of circular through holes, the through slots are a plurality of arc-shaped through slots, and the main body has a first surface and a second surface located on two opposite parallel sides of the main body, and the main body has a plurality of communication channels disposed on the second surface, wherein the circular through holes, the communication channels, and the arc-shaped through slots are disposed in a one-to-one correspondence, the circular through holes and the arc-shaped through slots run through the first surface and the second surface, and each of the communication channels is in communication with the corresponding circular through hole and the corresponding arc-shaped through slot.

10. The open nut according to claim 9, wherein a width of each of the communication channels decreases toward a middle portion of the communication channel from a connection portion between the communication channel and the circular through hole and from a connection portion between the communication channel and the arc-shaped through slot.

11. The open nut according to claim 8, wherein the two circulators are respectively fixed to the axial cylinder through screwing or bolting.

12. The open nut according to claim 8, wherein two positioning posts protrude from a side of the inner member away from the outer member, the first axial wall and the second axial wall of the axial cylinder respectively have a first positioning hole, and surfaces of the open shield parallel to the first axial wall and the second axial wall respectively have a second positioning hole, wherein the two positioning posts of each of the inner members respectively pass through and assembled in the corresponding first positioning hole and the corresponding second positioning hole.

13. The open nut according to claim 8, wherein the outer member further comprises a plurality of guiding protrusions, wherein each of the guiding protrusions corresponds to and extends toward the second end of the corresponding arc-shaped sliding groove.

14. The open nut according to claim 13, wherein each of the guiding protrusions has an arc-shaped surface, wherein the arc-shaped surface corresponds to a radian of the arc-shaped sliding groove and bends toward the inner spiral channels.

15. The open nut according to claim 8, wherein the inner member and the outer member are made of different materials.

16. The open nut according to claim 15, wherein the inner member is made of a plastic material, and the outer member is made of a metal material.

\* \* \* \* \*